United States Patent
Comaniciu

(10) Patent No.: US 7,298,868 B2
(45) Date of Patent: Nov. 20, 2007

(54) DENSITY ESTIMATION-BASED INFORMATION FUSION FOR MULTIPLE MOTION COMPUTATION

(75) Inventor: Dorin Comaniciu, Princeton Jct., NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 741 days.

(21) Appl. No.: 10/681,702

(22) Filed: Oct. 8, 2003

(65) Prior Publication Data

US 2004/0120550 A1    Jun. 24, 2004

Related U.S. Application Data

(60) Provisional application No. 60/416,835, filed on Oct. 8, 2002.

(51) Int. Cl.
*G06K 9/00* (2006.01)
(52) U.S. Cl. ........................ 382/107; 382/228
(58) Field of Classification Search ................ 382/107, 382/128, 151, 291, 228; 702/150
See application file for complete search history.

(56) References Cited

U.S. PATENT DOCUMENTS 6,314,204 B1 * 11/2001 Cham et al. ................ 382/228
7,099,796 B2 * 8/2006 Hamza ........................ 702/150

OTHER PUBLICATIONS

Simon J. Julier, et al., *A Non-Divergent Estimation Algorithm in the Presence of Unknown Correlations*, Proc. American Control Conf., Alberqerque, NM, 1997.
Lingji Chen et al., *Estimation under Unknown Correlation: Covariance Intersection Revisited*, IEEE Trans. Automatic Control, vol. 47, No. 11, pp. 1879-1882, 2002.

* cited by examiner

*Primary Examiner*—Jingge Wu
*Assistant Examiner*—Jayesh A Patel
(74) *Attorney, Agent, or Firm*—Donald B. Paschburg; F. Chau & Associates, LLC

(57) ABSTRACT

A fusion estimator is determined as the location of the most significant mode of a density function, which takes into account the uncertainty of the estimates to be fused. A mode detection method relies on mode tracking across scales. The fusion estimator is consistent and conservative, while handling naturally outliers in the data and multiple source models. The new estimator is applied for multiple motion estimation. Numerous experiments validate the theory and provide very competitive results. Other applications include generic distributed fusion, robot localization, motion tracking, registration of medical data, fusion for automotive tasks.

14 Claims, 6 Drawing Sheets

FIGURE 2C
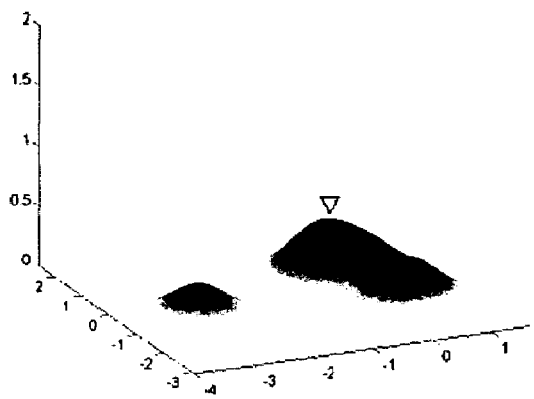
FIGURE 2D
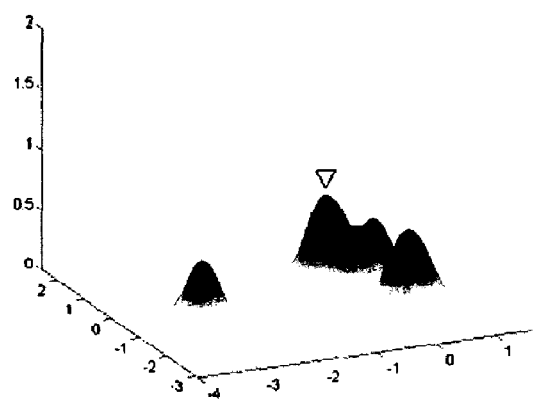
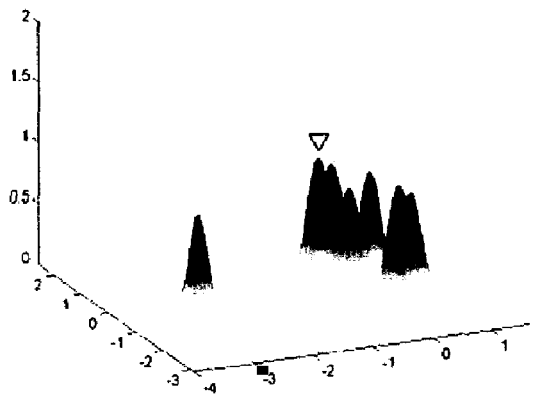
FIGURE 2E
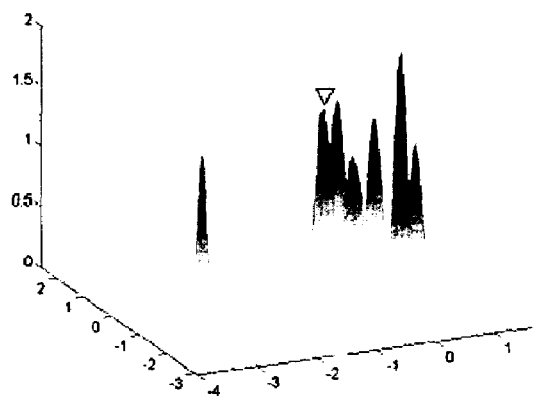
FIGURE 2F

DENSITY ESTIMATION-BASED INFORMATION FUSION FOR MULTIPLE MOTION COMPUTATION

CROSS-REFERENCE TO RELATED APPLICATIONS

The application claims priority to U.S. Provisional Application No. 60/416,835, which was filed on Oct. 8, 2002.

BACKGROUND OF THE INVENTION

1. Field of the Invention

The present invention relates to information fusion, and more particularly to nonparametric information fusion for motion estimation.

2. Discussion of Related Art

Information fusion is important for many computer vision tasks. Information fusion is also important across modalities, for applications such as collision warning and avoidance, and speaker localization. Typically, a classical estimation framework such as the extended Kalman filter is employed to derive an estimate from multiple sensor data.

The problem of information fusion appears in many forms in computer vision. Tasks such as motion estimation, multimodal registration, tracking, and robot localization, typically use a synergy of estimates coming from multiple sources. However, typically the fusion algorithms assume a single source model and are not robust to outliers. If the data to be fused follow different underlying models, the conventional algorithms would produce poor estimates.

The quality of information fusion depends on the uncertainty of cross-correlation data. Let $\hat{\chi}_1$ and $\hat{\chi}_2$ be two estimates that are to be fused together to yield an optimal estimate $\hat{\chi}$. The error covariances are defined by $$P_{ij} = E[(x-\hat{x}_i)(x-\hat{x}_j)^T] \quad (1)$$

for i=1,2 and j=1,2. To simplify the notation denote $P_{11} \equiv P_1$ and $P_{22} \equiv P_2$.

Ignoring the cross-correlation, $P_{12} = P_{21}^T = 0$, the best linear unbiased estimator (BLUE), also called Simple Convex Combination, is expressed by:

$$\hat{x}_{CC} = P_{CC}(P_1^{-1}\hat{x}_1 + P_2^{-1}\hat{x}_2) \quad (2)$$

$$P_{CC} = (P_1^{-1} + P_2^{-1})^{-1} \quad (3)$$

When the initial estimates are correlated $P_{12} \equiv P_{21}^T \neq 0$ and the noise correlation can be measured, the BLUE estimator $(\hat{\chi}_{BC}, P_{RC})$ is derived according to Bar-Shalom and Campo using a Kalman formulation. The most general case of BLUE estimation also assumes prior knowledge of the covariance of $\chi$.

A conservative approach to information fusion has been proposed by Julier and Uhlman in the form of the Covariance Intersection algorithm. The objective of the Covariance Intersection algorithm was to obtain a consistent estimator of the covariance matrix when two random variables are linearly combined and their cross-correlation is unknown. Consistency means that the estimated covariance is always an upper-bound, in the positive definite sense, of the true covariance, no matter what the cross-correlation level is. The intersection is characterized by the convex combination of the covariances $$\hat{x}_{CI} = P_{CI}(\omega P_1^{-1}\hat{x}_1 + (1-\omega)P_2^{-1}\hat{x}_2) \quad (4)$$

$$P_{CI} = (\omega P_1^{-1} + (1-\omega)P_2^{-1})^{-1} \quad (5)$$

where $\omega \in [0,1]$. The parameter $\omega$ is chosen to optimize the trace or determinant of $P_{CI}$.

Covariance Intersection has a very suggestive geometrical interpretation: if one plots the covariance ellipses $P_1$, $P_2$ and $P_{BC}$ (as given by the Bar-Shalom/Campo formulation) for all choices of $P_{12}$, then $P_{BC}$ always lies within the intersection of $P_1$ and $P_2$. Thus, the strategy determines a $P_{CI}$ that encloses the intersection region and is consistent even for unknown $P_{12}$. It has been shown in that the difference between $P_{CI}$ and the true covariance of $\chi$ is a semipositive matrix. More recently, Chong and Mori examined the performance of Covariance Intersection, while Chen, Arambel and Mehra analyzed the optimality of the algorithm.

Observe that the Covariance Intersection can be generalized to the fusion of n estimates as $$\hat{x}_{CI} = P_{CI} \sum_{i=1}^{n} \omega_i P_i^{-1} \hat{x}_i \quad (6)$$

$$P_{CI} = \left(\sum_{i=1}^{n} \omega_i P_i^{-1}\right)^{-1} \quad (7)$$

with $$\sum_{i=1}^{n} \omega_i = 1.$$

In equations 6 and 7 the weights $\omega_i$ are also chosen to minimize the trace or determinant of $P_{CI}$.

Although important from theoretical viewpoint, Covariance Intersection has at least two weaknesses: it assumes a single source model and is not robust to outliers.

Therefore, a need exists for a system and method for information fusion that accommodates multiple source models and is robust to outliers.

SUMMARY OF THE INVENTION

According to an embodiment of the present invention, an information fusion method comprises determining a plurality of initial estimates comprising mean and covariance information, the plurality of initial estimates corresponding to a data, and determining a density based fusion estimate as a most significant mode of a density function determined from the plurality of initial estimates.

The density function is determined according to a variable-bandwidth kernel density estimate. The method comprises determining a covariance of the fusion estimate, wherein the covariance is a convex combination of covariances of the plurality of initial estimates, each initial estimate having a weight, wherein the weights of the initial estimates are determined according to the most significant mode of the data. The most significant mode is determined by mode tracking across scales, the mode tracking beginning with a unique mode defined at a relatively large scale and tracking that mode toward a relatively smaller scale.

Determining the plurality of initial estimates comprises determining a window bounding the data for motion estimation. The method further comprises determining a matrix of spatial gradients in the data, determining a vector of temporal image gradients in the data, and determining the covariance information as a matrix proportional to a variance of noise in the data based on the matrix of spatial gradients and the vector of temporal image gradients.

According to an embodiment of the present invention, a method for nonparametric information fusion for motion estimation comprises determining a plurality of initial estimates of motion, tracking a mode of a density function across scales given multiple source models, wherein each source model corresponds to a set of initial estimates of motion, and determining a location of a most significant mode of the density function from a fusion of the initial estimates, wherein the most significant mode is a motion estimate.

The method comprises determining a covariance of the fusion of the initial estimates, wherein the covariance is a convex combination of covariances of the plurality of initial estimates, each initial estimate having a weight, wherein the weights of the initial estimates are determined according to the most significant mode of the data. The most significant mode is determined by mode tracking across scales starting from a unique mode defined at a large scale and tracking that mode toward smaller scales.

The density function is determined as a sum value of a plurality of Gaussian kernels located at data points in a predetermined neighborhood of data. Each Gaussian kernel comprises spread information and orientation information.

According to an embodiment of the present invention, a program storage device is provided, readable by machine, tangibly embodying a program of instructions executable by the machine to perform method steps for information fusion. The method comprising determining a plurality of initial estimates comprising mean and covariance information, the plurality of initial estimates corresponding to a data, and determining a density based fusion estimate as a most significant mode of a density function determined from the plurality of initial estimates.

BRIEF DESCRIPTION OF THE DRAWINGS

Preferred embodiments of the present invention will be described below in more detail, with reference to the accompanying drawings:

FIGS. 2c-f are graphs showing density surfaces corresponding to equation (8) with different values for • according to an embodiment of the present invention;

DETAILED DESCRIPTION OF PREFERRED EMBODIMENTS

According to an embodiment of the present invention, a nonparametric approach to information fusion is called Variable-Bandwidth Density-based Fusion (VBDF). A fusion estimator is determined as the location of the most significant mode of a density function, which takes into account the uncertainty of estimates to be fused. According to an embodiment of the present invention, a method utilizes a variable-bandwidth mean shift determined at multiple scales. The fusion estimator is consistent and conservative, while handling naturally outliers in the data and multiple source models. Experimental results for a fusion estimator according to an embodiment of the present invention are shown for the task of multiple motion estimation, however, is should be noted that a fusion estimator can be applied to other fields, such as collision avoidance, multi-modal registration of medical data, tracking, robotic localization, and heart motion estimation.

For purposes of the description, multiple sensors provide sensor measurements. Each sensor measurement is characterized by its mean vector and a covariance matrix defining an uncertainty of the mean. When the processing of all measurements takes place at a single location, the fusion is called centralized. In centralized fusion the sensor measurement errors are typically considered independent across sensors and time. A construction with improved reliability and flexibility is provided by distributed fusion, represented by a collection of processing nodes that communicate with each other. Such architecture handles the information as follows: the sensor measurements are evaluated and the state information from a local neighborhood is fused. An important topic in distributed fusion is the handling of cross-correlation, which is difficult to evaluate. The Covariance Intersection algorithm provides a consistent and conservative solution to this problem.

The distributed fusion architecture is suitable for the task of motion estimation from image sequences. According to an embodiment of the present invention, it is assumed that some image property, such as the brightness, is conserved locally in time constrains the component of the motion field in the direction of the spatial image gradient. The initial motion estimates from a given neighborhood or portion of data are fused to exploit spatial coherence.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 1:
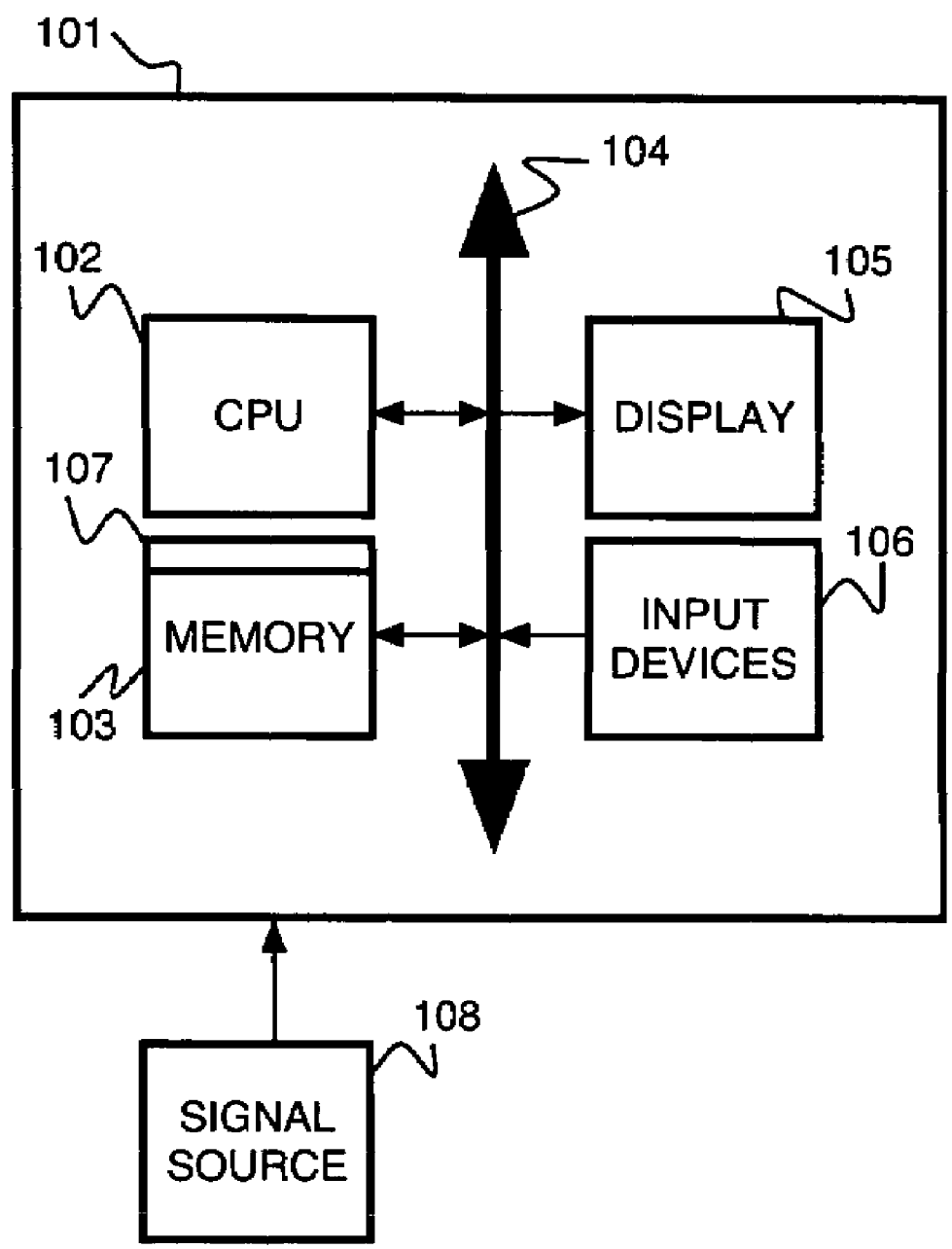
FIG. 1 is a diagram of a system according to an embodiment of the present invention.

Referring to FIG. 1, according to an embodiment of the present invention, a computer system 101 for implementing the present invention can comprise, inter alia, a central processing unit (CPU) 102, a memory 103 and an input/output (I/O) interface 104. The computer system 101 is generally coupled through the I/O interface 104 to a display 105 and various input devices 106 such as a mouse and keyboard. The support circuits can include circuits such as cache, power supplies, clock circuits, and a communications bus. The memory 103 can include random access memory (RAM), read only memory (ROM), disk drive, tape drive, etc., or a combination thereof. The present invention can be implemented as a routine 107 that is stored in memory 103 and executed by the CPU 102 to process the signal from the signal source 108. As such, the computer system 101 is a general purpose computer system that becomes a specific purpose computer system when executing the routine 107 of the present invention.

The computer platform 101 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

An adaptive density estimation with variable kernel bandwidth can be applied in computer vision. Variable-bandwidth methods improve the performance of kernel estimators by adapting the kernel scaling and orientation to the local data statistics.

Let $\chi_i$, $i=1 \ldots n$, be n data points in the d-dimensional space $R^d$. By selecting a different bandwidth matrix $H_i = H(x_i)$ (e.g., assumed full rank) for each $\chi_i$ we define the sample point density estimator is defined as:

$$\hat{f}_v(x) = \frac{1}{n(2\pi)^{d/2}} \sum_{i=1}^{n} \frac{1}{|H_i|^{1/2}} \exp\left(-\frac{1}{2} D^2(x, x_i, H_i)\right) \quad (8)$$

where $$D^2(x, x_i, H_i) \equiv (x - x_i)^T H_i^{-1} (x - x_i) \quad (9)$$

is the Mahalanobis distance from $\chi$ to $\chi_i$. The variable-bandwidth mean shift vector at location $\chi$ is given by:

$$m_v(x) \equiv H_h(x) \sum_{i=1}^{n} \omega_i(x) H_i^{-1} x_i - x \quad (10)$$

where $H_h$ is the data-weighted harmonic mean of the bandwidth matrices determined at $\chi$ $$H_h(x) = \left(\sum_{i=1}^{n} \omega_i(x) H_i^{-1}\right)^{-1} \text{ and} \quad (11)$$

$$\omega_i(x) = \frac{\frac{1}{|H_i|^{1/2}} \exp\left(-\frac{1}{2} D^2(x, x_i, H_i)\right)}{\sum_{i=1}^{n} \frac{1}{|H_i|^{1/2}} \exp\left(-\frac{1}{2} D^2(x, x_i, H_i)\right)} \quad (12)$$

are weights satisfying $$\sum_{i=1}^{n} \omega_i(x) = 1.$$

It can be shown that the iterative computation of the mean shift vector (10) always moves the point $\chi$ to a location where the density (8) is higher or equal to the density at a previous location. As a result, an iterative hill-climbing procedure is defined, which converges to a stationary point, e.g., zero gradient, of the underlying density.

The VBDF estimator is defined as the location of the most significant sample mode of the data.

For determination through multiscale optimization, assume that the data points $x_i$, $i=1 \ldots n$ are each associated with a covariance matrix $C_i$ that quantifies uncertainty. The location of the most significant mode is determined in a multiscale fashion, by tracking the mode of the density function across scales.

More specifically a first mode detection is performed using large bandwidth matrices of the form $H_i = C_i + \alpha^2 I$, where the parameter $\alpha$ is large with respect to the spread of the points $\chi_i$. The mode detection method is based on mean shift and involves the iterative computation of expression (10) and translation of $\chi$ by $m_v(\chi)$ until convergence. At the largest scale, the mode location does not depend on the initialization, up to some numerical approximation error, since for large $\alpha$ the density surface is unimodal. In the next stages, the detected mode is tracked across scales by successively reducing the parameter $\alpha$ and performing mode detection again. At each scale the mode detection algorithm is initialized with the convergence location from the previous scale.

Note that for the last mode detection procedure, the bandwidth matrix associated with each data point is equal to the point covariance matrix, where, $H_i = C_i$, $i=1 \ldots n$. Denote by $\chi_m$ the location of the most significant mode. Since the gradient at $\hat{\chi}_m$ is zero, $m_v(\hat{\chi}_m) = 0$, which means $$\hat{x}_m = H_h(\hat{x}_m) \sum_{i=1}^{n} \omega_i(\hat{x}_m) H_i^{-1} x_i \quad (13)$$

$$H_h(\hat{x}_m) = \left(\sum_{i=1}^{n} \omega_i(\hat{x}_m) H_i^{-1}\right)^{-1} \quad (14)$$

A VBDF estimator can be expressed as Equations (13) and (14), wherein the VBDF estimator has the following properties: the covariance (14) of the fusion estimate is a convex combination of the covariances of initial estimates. The matrix $H_h(\hat{\chi}_m)$ is a consistent and conservative estimate of the true covariance matrix of $\hat{\chi}_m$, irrespective of the actual correlations between initial estimates. The criterion of a method according to an embodiment of the present invention is based on the most probable value of the data, e.g., the most significant mode. This criterion can be used when the data is multimodal, where the initial estimate belong to different source models. Such a property is common for motion estimation since the points in a local neighborhood may exhibit multiple motions. The most significant mode corresponds to the most relevant motion. The tracking of the density mode across scales insures the detection of the most significant mode. The use of a Gaussian kernel is used for the continuity of the modes across scales. Also, by selecting the most significant mode, the estimate is also robust to outliers.

Figure 2A:
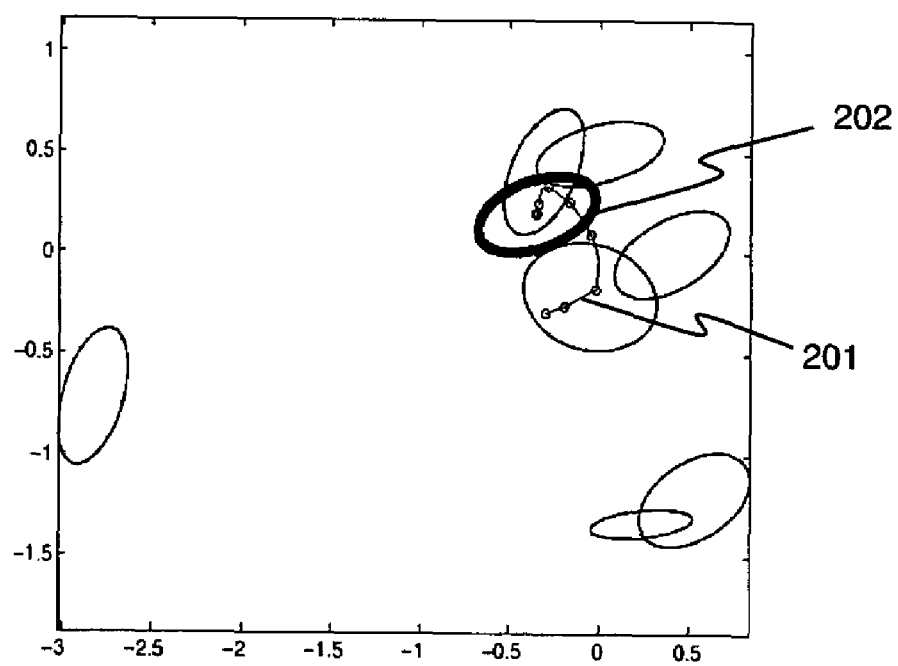
FIG. 2a is a graph of input data represented as ellipses with 95% confidence according to an embodiment of the present invention.

Comparing, experimentally, the new VBDF estimator against the BLUE and Covariance Intersection, a synthetic input data is shown in FIG. 2a and comprises eight initial bi-variate estimates expressed as location and covariance. Each covariance is displayed as an ellipse with 95% confidence. Trajectory of mode tracking across scales is shown 201. An ellipse corresponding to a VBDF 202 estimate is drawn with a think line. Observe that the input data has a clearly identifiable structure of five measurements, while the other three measurements can be considered outliers. In addition, the uncertainty of the data is low and the mean vectors are far apart from each other. This creates a difficult mode estimation problem.

The same figure shows the VBDF estimate, having a mean equal to (−0.3499,0.1949) and its covariance, represented by an ellipse of thick line. The VBDF ellipse masks one of the input ellipses. The trajectory of the mode tracking across scales is also plotted. Each small circle indicates the result of mode detection for one scale.

Figure 2B:
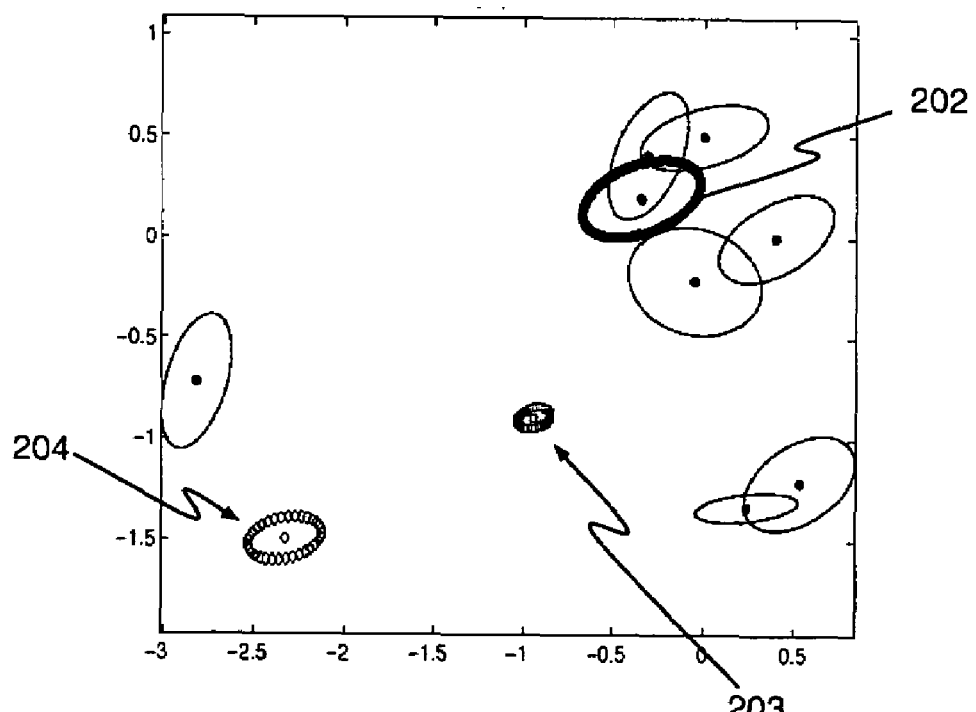
FIG. 2b is a graph of fusion results overlaid on input data according to an embodiment of the present invention.

In FIG. 2b a result of the VBDF is compared with that of the BLUE fusion ((2) and (3)) and Covariance Intersection ((6) and (7)). In FIG. 2b, fusion results are overlaid on input data. Ellipses are represented with squares for BLUE estimate 203 and diamonds for Covariance Intersection 204. The kernel density estimate determined with $H_i=C_i+\alpha^2 I$ is shown in FIGS. 2c-f for different values of $\alpha$. A triangle marks the location of the most significant mode across scales. FIG. 2f is obtained with $H_i=C_i$ and corresponds to a VBDF estimate.

The following conclusions can be drawn: the BLUE estimate produces the most confident result, however, the presence of outliers in the data has a strong, negative influence on this estimate. At the same time the BLUE estimate can be overly confident by neglecting the cross-correlation. The Covariance Intersection is also negatively influenced by outliers. The weights have been optimized to minimize the trace of the covariance matrix. However, since the optimization regards only the covariance and not the location, the resulting estimate is rather poor. Note that by employing the variable-bandwidth mean shift and mode tracking across scales, the VBDF uses an optimization of the weights. Observe that, as expected, the VBDF method has not been influenced by outliers. Inferring from FIG. 2c, the most significant mode across scales is not the highest mode determined with the bandwidths $H_i=C_i$! Note the highest location on the density landscape determined with $H_i=C_i$ is located at (0.2380,−1.333), which is different from the VBDF estimate. This conclusion is in agreement with an expectation that the most significant mode should not be determined based solely on local information. The multi-scale method makes the right choice in selecting the right mode.

For the estimation of multiple motion, an application of the VBDF estimator is adapted to the computation of multiple motion. Detailed reviews on motion estimation are given by Aggarwal and Nandhakumar, Mitiche and Bouthemy, and Nagel. Three main approaches to motion estimation can be identified, based on spatial gradient, image correlation, and regularization of spatio-temporal energy. The motion is commonly assumed to be locally constant, affine, or quadratic.

Many of the techniques based on spatial gradient embrace a two step approach for the computation of motion flow. An initial estimate of the flow is determined for each image location using the brightness constancy. The initial estimates are then fused locally in the hope for a better fusion estimate. The presence of multiple motions, however, makes the second task difficult since the initial estimates are generated by multiple and unknown source models. Multiple motions can be generated by objects moving with different velocities, but can also be the result of transparency, highlights or shadows.

One of the most popular and efficient optical flow techniques has been developed by Lucas and Kanade in the context of stereo vision. They neglected the uncertainty of initial estimates and use (weighted) least squares in a neighborhood to fuse them. Weber and Malik employed the total least squares for the same task. Simoncelli, Adelson and Heeger improved the method by determining and using the uncertainty of initial estimates. Nevertheless, they assume that the initial estimates are independent and do not model multiple motions. Black and Anandan approached the motion estimation problem in a robust framework, being able to deal with multiple motions.

The first benchmarking effort on the evaluation of motion estimation algorithms has been conducted by Barron, Fleet and Beuchemin. Since then, many of the newly proposed methods are compared using the Barron, Fleet and Beuchemin methodology, as is presented herein with respect to the experimental data achieved for a VBDF method according to an embodiment of the present invention.

For a given image location we extract an initial motion estimate is extracted from a very small N×N neighborhood using Biased Least Squares (BLS)

$$\hat{x}=(A^T A+\beta I)^{-1} A^T b \qquad (15)$$

where A is the $N^2 \times 2$ matrix of spatial image gradients, and b is the $N^2$-dimensional vector of temporal image gradients.

The BLS solution has a covariance matrix C that is proportional to the variance $\sigma^2$ of the image noise. The advantage of BLS is that it avoids instability problems in the regular Least Squares solution by allowing a small amount of bias. The technique is also called ridge regression or Tikhonov regularization and various solutions have been proposed to compute the regularization parameter $\beta$ from the data.

The motion flow information is combined in a local image neighborhood of dimension n=M×M using the VBDF estimator ((13) and (14)). Denoting by $(\hat{\chi}_i, C_i)$, i=1 . . . n the initial flow estimates produced through BLS, their fusion results in $$\hat{x}_m = C(\hat{x}_m) \sum_{i=1}^{n} \omega_i(\hat{x}_m) C_i^{-1} \hat{x}_i \qquad (16)$$

$$C(\hat{x}_m) = \left( \sum_{i=1}^{n} \omega_i(\hat{x}_m) C_i^{-1} \right)^{-1} \qquad (17)$$

where $$\omega_i(\hat{x}_m) = \frac{\frac{1}{|C_i|^{1/2}} \exp\left(-\frac{1}{2} D^2(\hat{x}_m, \hat{x}_i, C_i)\right)}{\sum_{i=1}^{n} \frac{1}{|C_i|^{1/2}} \exp\left(-\frac{1}{2} D^2(\hat{x}_m, \hat{x}_i, C_i)\right)} \qquad (18)$$

and $\hat{\chi}_m$ is determined through mode tracking across scales, as discussed above as the determination through multiscale optimization.

Regarding the experiments, a three level image pyramid was constructed using a five-tap filter [0.0625\0.25\0.375\0.25\0.0625]. For the derivative filters in both spatial and temporal domain we used the simple difference. As a result, the optical flow was determined from three frames, from coarse to fine. Initial flow estimates were obtained in a neighborhood of three (i.e., N=3) and the regularization parameter β=1. Estimation errors were evaluated using the software that determines the average angular error $\mu_e$ and its standard deviation $\sigma_e$. Here, the flow estimated with a density of 100 is discussed.

Figure 3A:
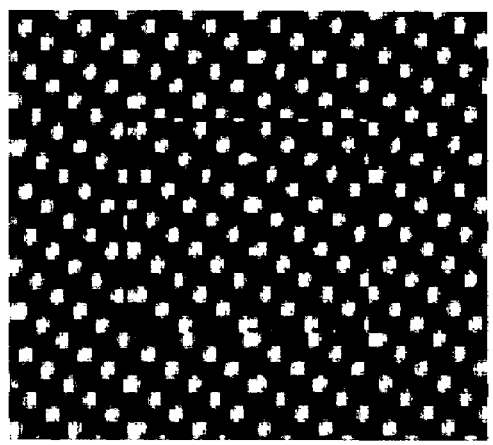
FIG. 3a shows frame 9 of the New-Sinusoid1 sequence.
Figure 3B:
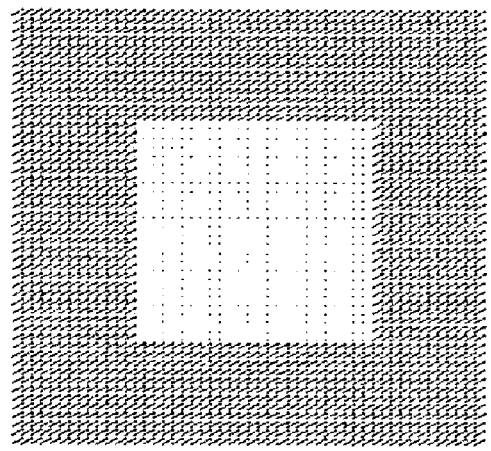
FIG. 3b shows a correct flow of FIG. 3a according to an embodiment of the present invention.

A first test involved the sequence New-Sinusoidi introduced by Bab-Hadiashar and Suter. This sequence (see FIG. 3a) has spatial frequencies similar to Sinusoidi from but has a central stationary square of 50 pixels, thus containing motion discontinuities. The correct flow for New-Sinusoid1 is shown in FIG. 3b. The robust motion estimation method described in has errors in the range ($\mu_e$=1.51–2.82, $\sigma_e$=5.86–8.82).

Figure 3C:
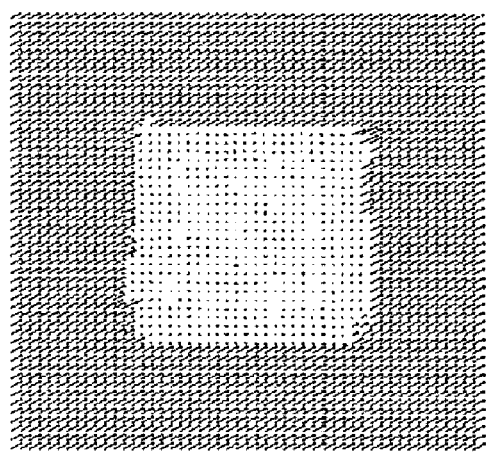
FIG. 3c shows a VBDF flow according to an embodiment of the present invention.
Figure 3D:
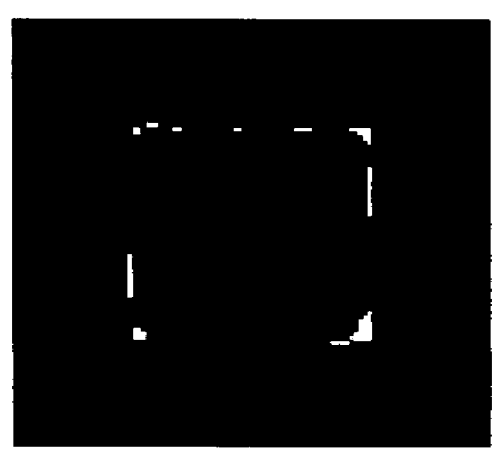
FIG. 3d shows error corresponding to FIGS. 3b and 3C, according to an embodiment of the present invention.

Using VBDF estimation according to an embodiment of the present invention, a substantially decrease in errors was obtained to ($\mu_e$=0.57, $\sigma_e$=5.2) and the estimated motion has sharp boundaries (FIG. 3c). In FIG. 3d the angular error is shown multiplied by 100 (white space corresponds to large errors). These results were obtained with a seven analysis window (e.g., M=7) and variable bandwidth mean shift applied across five scales. The noise variance used in BLS has been assumed to be $\sigma^2$=0.08, equal to that of the quantization noise. An average number of three mean shift iterations per scale per window were executed.

A second test was performed using the Yosemite sequence. This synthetic sequence comprises many challenges, including multiple motions and aliasing. Numerous results have been reported on Yosemite involving either the complete sequence, or the partial sequence, with the sky and clouds discarded. For the complete sequence, a VBDF method according to an embodiment of the present invention resulted in ($\mu_e$=4.25, $\sigma_e$=7.82) for the middle frame. The estimated flow is shown in 3a and 3b presents the angular error.

Figure 4:
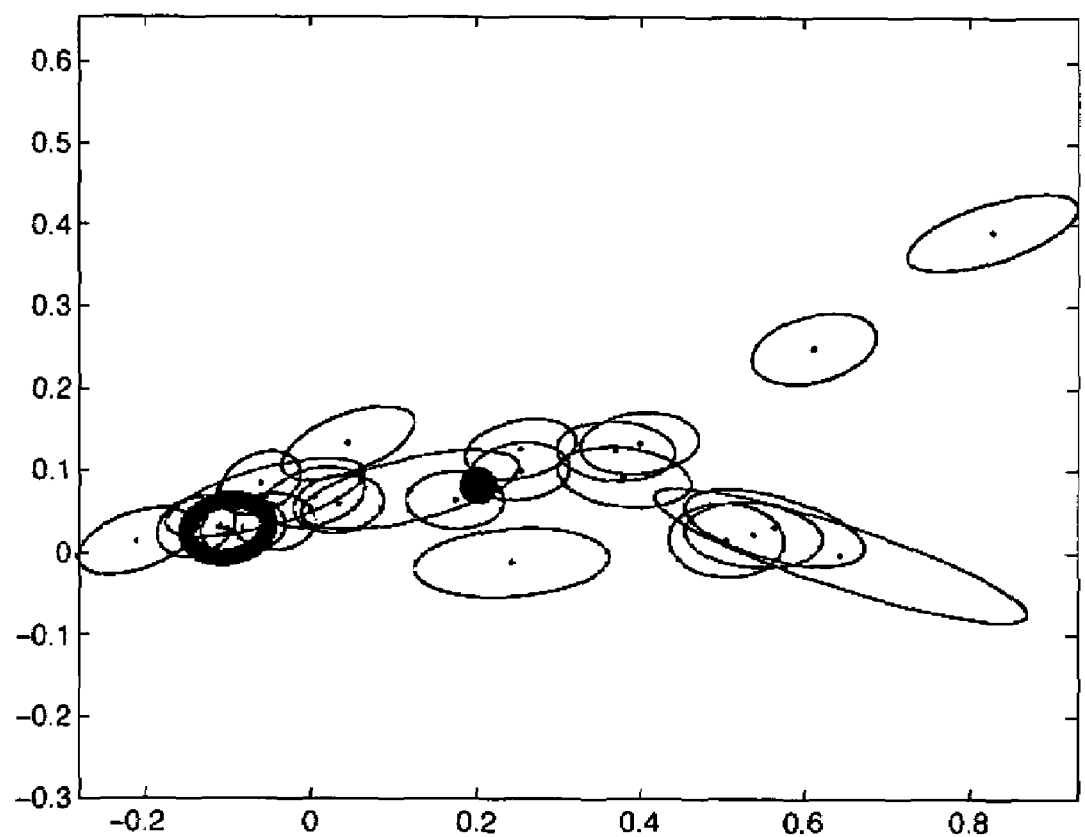
FIG. 4 is a graph of ellipses with 95% confidence representing initial flow estimates for the location (49,13) of the top level of Yosemite pyramid according to an embodiment of the present invention.

In FIG. 4 a fusion example is shown for Yosemite corresponding to the location (49,13) at the top of the image pyramid. A window of M=5 has been used to collect 25 initial estimates. The starting point of a method according to an embodiment of the present invention is represented by a large dot in the center. This location is situated at the border between the sky and mountain. The initial location of the mode detection algorithm is marked by a large dot. The VBDF ellipse, according to an embodiment of the present invention, is drawn with a thick line.

For the skyless Yosemite, a VBDF method according to an embodiment of the present invention obtained ($\mu_e$=1.55, $\sigma_e$=1.65).

In comparison to other techniques, a VBDF method is simple, easy to implement, and efficient, being based on the detection of the most significant mode of the density of some initial estimates. For Yosemite, a 15×15 analysis window and $\sigma^2$=7.82 were used. In addition, the distances between the initial flow vectors were weighted according to the intensity difference between the corresponding image pixels by a Gaussian kernel of standard deviation equal to twelve. This assured that flow vectors similar in direction and magnitude and coming from locations with similar intensity were grouped together.

For the Translating Tree, a VBDF method according to an embodiment of the present invention obtained ($\mu_e$=0.19, $\sigma_e$=0.17). For the Diverging Tree a VBDF method according to an embodiment of the present invention resulted in ($\mu_e$=1.10, $\sigma_e$=0.73). Resulting flow for the SRI sequence is presented in FIG. 7. Observe the sharp flow boundaries. The same parameters as in Yosemite were used for these sequences, but without intensity weighting.

According to an embodiment of the present invention, a VBDF estimator is provided as a powerful tool for information fusion based on adaptive density estimation. A fusion estimator can handle with multiple source models and to handle cross-correlation in a consistent way. Comparing the VBDF framework with the BLUE fusion and Covariance Intersection showed that the new estimator can be used to construct a very effective motion computation method.

Figure 5:
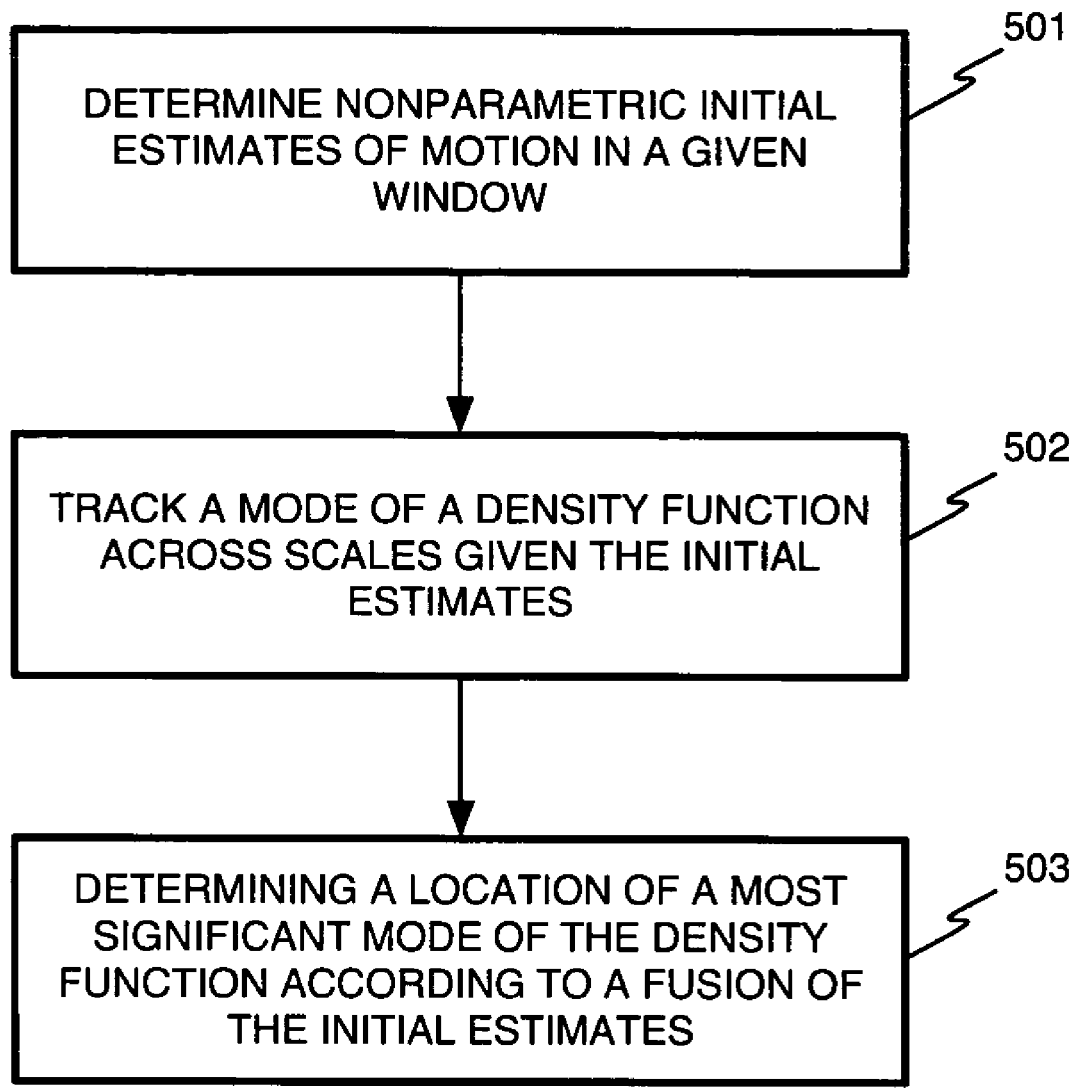
FIG. 5 is a flow chart of a method according to an embodiment of the present invention.

The detection of the most significant mode of a density function is accomplished through mode tracking across scales, that is each successive estimation uses a previous estimation as a starting point. Referring to FIG. 5, a method for information fusion comprises determining a plurality of initial estimates of motion 501, tracking a mode of a density function across scales given multiple source models, wherein each source model corresponds to an initial estimate of motion 502, and determining a location of a most significant mode of the density function from a fusion of the initial estimates. In the context of motion estimation, the most significant mode corresponds to the most relevant motion in the local neighborhood 503. The same concepts can be naturally extended to other vision domains such as stereo, tracking, or robot localization.

Having described embodiments for nonparametric information fusion for motion estimation, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. An information fusion method comprising:
determining a plurality of initial estimates of motion of an object comprising mean and covariance information; and
determining a density based fusion estimate as a most significant mode of a density function determined from the plurality of initial estimates of motion of an object, wherein the most significant mode corresponds to a determined motion estimate of the object,
wherein the most significant mode is determined by mode tracking across scales, the mode tracking beginning with a unique mode defined at a relatively large scale and tracking that mode toward a relatively smaller scale.

2. The method of claim 1, wherein the density function is determined according to a variable-bandwidth kernel density estimate.

3. The method of claim 1, further comprising determining a covariance of the fusion estimate, wherein the covariance is a convex combination of covariances of the plurality of initial estimates, each initial estimate having a weight, wherein the weights of the initial estimates are determined according to the most significant mode of the data.

4. The method of claim 1, wherein determining the plurality of initial estimates comprises determining a window bounding the data for motion estimation.

5. The method of claim 4, further comprising:
determining a matrix of spatial gradients in the data;
determining a vector of temporal image gradients in the data; and
determining the covariance information as a matrix proportional to a variance of noise in the data based on the matrix of spatial gradients and the vector of temporal image gradients.

6. A computer readable medium embodying instructions executable by a processor to perform a method for nonparametric information fusion for motion estimation comprising:
determining a plurality of initial estimates of motion from a sequence of images;
tracking a mode of a density function across scales given multiple source models,
wherein each source model corresponds to a set of initial estimates of motion; and
determining a location of a most significant mode of the density function from a fusion of the initial estimates, wherein the most significant mode is output as a motion estimate from a sequence of images,
wherein the most significant mode is determined by mode tracking across scales starting from a unique mode defined at a large scale and tracking that mode toward smaller scales.

7. The method of claim 6, further comprising determining a covariance of the fusion of the initial estimates, wherein the covariance is a convex combination of covariances of the plurality of initial estimates, each initial estimate having a weight, wherein the weights of the initial estimates are determined according to the most significant mode of the data.

8. The method of claim 6, wherein the density function is determined as a sum value of a plurality of Gaussian kernels located at data points in a predetermined neighborhood of data.

9. The method of claim 8, wherein each Gaussian kernel comprises spread information and orientation information.

10. A program storage device readable by machine, tangibly embodying a program of instructions executable by the machine to perform method steps for information fusion, the method steps comprising:
determining a plurality of initial estimates of motion of an object comprising mean and covariance information, the plurality of initial estimates; and
determining a density based fusion estimate as a most significant mode of a density function determined from the plurality of initial estimates of motion of an object, wherein the most significant mode corresponds to a determined motion estimate of the object,
wherein the most significant mode is determined by mode tracking across scales, the mode tracking beginning with a unique mode defined at a relatively large scale and tracking that mode toward a relatively smaller scale.

11. The method of claim 10, wherein the density function is determined according to a variable-bandwidth kernel density estimate.

12. The method of claim 10, further comprising determining a covariance of the fusion estimate, wherein the covariance is a convex combination of covariances of the plurality of initial estimates, each initial estimate having a weight, wherein the weights of the initial estimates are determined according to the most significant mode of the data.

13. The method of claim 10, wherein determining the plurality of initial estimates comprises determining a window bounding the data for motion estimation.

14. The method of claim 13, further comprising:
determining a matrix of spatial gradients in the data;
determining a vector of temporal image gradients in the data; and determining the covariance information as a matrix proportional to a variance of noise in the data based on the matrix of spatial gradients and the vector of temporal image gradients.

* * * * *